United States Patent
Belharouak et al.

(10) Patent No.: US 11,508,962 B2
(45) Date of Patent: Nov. 22, 2022

(54) BATTERY MATERIALS SCALE-UP AND PROCESSES

(71) Applicant: UT-Battelle, LLC, Oak Ridge, TN (US)

(72) Inventors: Ilias Belharouak, Oak Ridge, TN (US); Nitin Muralidharan, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 16/781,063

(22) Filed: Feb. 4, 2020

(65) Prior Publication Data
US 2020/0251734 A1  Aug. 6, 2020

Related U.S. Application Data

(60) Provisional application No. 62/800,580, filed on Feb. 4, 2019.

(51) Int. Cl.
| | |
|---|---|
| *H01M 4/525* | (2010.01) |
| *H01M 10/0525* | (2010.01) |
| *H01M 4/505* | (2010.01) |
| *C01G 53/00* | (2006.01) |
| *H01M 4/02* | (2006.01) |

(52) U.S. Cl.
CPC ............ *H01M 4/525* (2013.01); *C01G 53/42* (2013.01); *C01G 53/50* (2013.01); *H01M 4/505* (2013.01); *H01M 10/0525* (2013.01); *C01P 2006/40* (2013.01); *H01M 2004/028* (2013.01)

(58) Field of Classification Search
CPC .. H01M 4/525; H01M 10/0525; H01M 4/505; H01M 2004/028; H01M 4/485; C01G 53/50; C01G 53/42; C01G 53/006; C01G 53/44; C01G 53/00; C01P 2006/40; Y02E 60/10
See application file for complete search history.

(56) References Cited

U.S. PATENT DOCUMENTS

| | | | |
|---|---|---|---|
| 5,720,932 A | 2/1998 | Amine et al. | |
| 2005/0152830 A1* | 7/2005 | Yasutomi | H01G 9/155 423/594.4 |
| 2006/0083989 A1* | 4/2006 | Suhara | C01G 53/006 429/231.3 |

FOREIGN PATENT DOCUMENTS

| | | |
|---|---|---|
| AU | 2011290195 B2 | 2/2012 |
| EP | 3024068 A1 | 5/2016 |

OTHER PUBLICATIONS

International Search Report and Written Opinion for International Application No. PCT/US2020/016518 dated May 29, 2020.

* cited by examiner

*Primary Examiner* — Andrew J. Oyer
(74) *Attorney, Agent, or Firm* — Warner Norcross + Judd LLP

(57) ABSTRACT

A cathode active material precursor for a lithium metal oxide is provided. The cathode active material precursor comprises a metal-containing oxyhydroxide. The metal-containing oxyhydroxide comprises nickel and an additional metal. At least 50 mol. % of the nickel of the metal-containing oxyhydroxide has an oxidation state of +3. A method of forming a cathode active material precursor is also provided. The method comprises combining a nickel-containing compound, an additional metal-containing compound, an oxidizing agent, and a solvent to form a solution. The method further comprises exposing the solution to heat at a temperature of from about 30° C. to about 90° C. to form a precipitate comprising the metal-containing oxyhydroxide.

9 Claims, No Drawings

BATTERY MATERIALS SCALE-UP AND PROCESSES

CROSS-REFERENCE TO RELATED APPLICATIONS

This application claims the benefit of U.S. Provisional Application 62/800,580, filed Feb. 4, 2019, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE DISCLOSURE

The present disclosure relates to cathode active material precursors comprising a metal-containing oxyhydroxide, and lithium metal oxides formed therefrom.

BACKGROUND OF THE DISCLOSURE

A nickel (Ni)-rich cathode active material among lithium metal oxides ($LiMO_2$) with a layered structure, in which Ni/M≥0.8, may implement a large capacity of about 200 milliampere-hours per gram (mAh/g) or greater, and thus is considered to be a suitable cathode material for next-generation electric vehicles and power storages. However, cation mixing between the transition metal and lithium slabs in these nickel (Ni)-rich cathode active materials commonly occurs due to a similarity of $Ni^{2+}$ and $Li^+$ ionic radii. In particular, conventional cathode active materials are formed from precursors in the hydroxide form ($Ni_yM_{1-y}(OH)_2$, 0<y<1, and M is a transition metal or other ion). These hydroxide precursors incorporate nickel in the +2 oxidation state. Cation mixing results in blocking of lithium diffusion pathways by the nickel ions in a +2 oxidation state thereby leading to decreased performance (e.g. reduced capacity) of the resulting lithium metal oxide.

In an attempt to overcome cation mixing of nickel into the lithium slabs, further calcination of the nickel-containing hydroxide precursors in an oxygen rich environment can provide incorporation of nickel in the +3 oxidation state. However, this additional processing step results in an increase in operating cost and requires current facilities to make a significant capital investment to implement. Even if the additional processing step is implemented, a considerable amount of $Ni^{2+}$ ions still remain which occupy sites in the lithium slab blocking lithium diffusion pathways.

Accordingly, there remains a need for an improved nickel (Ni)-rich cathode active material that exhibits reduced cation mixing.

SUMMARY OF THE DISCLOSURE

In one embodiment, a cathode active material precursor for a lithium metal oxide is provided. The cathode active material precursor comprises a metal-containing oxyhydroxide. The metal-containing oxyhydroxide comprises nickel and an additional metal. At least 50 mol. % of the nickel of the metal-containing oxyhydroxide has an oxidation state of +3.

In various embodiments, a lithium metal oxide formed from the cathode active material precursor has a crystalline structure comprising a transition metal-containing slab and a lithium-containing slab. In these and other embodiments, the lithium-containing slab is substantially free of nickel. In contrast to the hydroxide form (—OH) of conventional precursors, it is believed that the oxyhydroxide form (—OOH) of the cathode active material precursor incorporates nickel ions in a +3 oxidation state thereby minimizing cation mixing with lithium. In particular, the oxyhydroxide form (—OOH) of the cathode active material precursor may incorporate nickel ions in the +3 oxidation state which upon calcination may remain in the transition metal-containing slab thus minimizing cation mixing with the lithium-containing slab. As a result, lithium diffusion pathways are not blocked by nickel ions in a +2 oxidation state thereby leading to improved performance of the resulting lithium metal oxide.

In another embodiment, a method of forming a cathode active material precursor is also provided. The method comprises combining a nickel-containing compound, an additional metal-containing compound, an oxidizing agent, and a solvent to form a solution. The method further comprises exposing the solution to heat at a temperature of from about 30° C. to about 90° C. to form a precipitate comprising the metal-containing oxyhydroxide.

These and other features and advantages of the present invention will become apparent from the following description of the invention, when viewed in accordance with the appended claims.

DETAILED DESCRIPTION

A cathode active material precursor for a lithium metal oxide, and a method for making the same, are provided. A cathode active material precursor, and the lithium metal oxide formed therefrom, may exhibit improved morphological control of its cations by reducing cation mixing. It is believed that an improved morphological control, beginning at the precursor level, will result in improved utilization of capacities of the lithium metal oxide.

The cathode active material precursor comprises a metal-containing oxyhydroxide. As will be described in greater detail below, the metal-containing oxyhydroxide may be processed with a lithium-containing compound to form the lithium metal oxide. The metal-containing oxyhydroxide comprises nickel and an additional metal. In certain embodiments, the metal-containing oxyhydroxide has a formula according to Formula I:

$$Ni_yM_{1-y}(OOH) \qquad\qquad I;$$

wherein 0<y<1, and M is one or more of the additional metal. The variable y may be a number from greater than 0 to less than 1 or optionally from greater than 0.1 to less than 1.

In embodiments when M represents more than one of the additional metal, M may comprise M1, M2, M3, M4, . . . etc. with each being subdivided to correspond with 1−y of Formula I. For example, Formula I may be further defined as 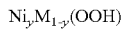 wherein x+y+z=1.

At least 50 mol. % of the nickel of the nickel-containing oxyhydroxide has an oxidation state of +3. Optionally, at least 60 mol. %, at least 75 mol. %, at least 90 mol. %, at least 95 mol. %, or at least 99 mol. % of the nickel of the nickel-containing oxyhydroxide has an oxidation state of +3. In contrast to the hydroxide form (—OH) of conventional precursors, the oxyhydroxide form (—OOH) of the cathode active material precursor incorporates nickel ions in a +3 oxidation state thereby minimizing cation mixing with lithium. As a result, lithium diffusion pathways are not blocked by nickel ions in a +2 oxidation state thereby leading to improved performance of the resulting lithium metal oxide.

In various embodiments, the additional metal may be selected from cobalt (Co), iron (Fe), aluminum (Al), manganese (Mn), magnesium (Mg) calcium (Ca), titanium (Ti), vanadium (V), chromium (Cr), copper (Cu), zinc (Zn), gallium (Ga), strontium (Sr), yttrium (Y), zirconium (Zr), niobium (Nb), molybdenum (Mo), and ruthenium (Ru), and combinations thereof. In exemplary embodiments, the additional metal may be selected from cobalt (Co), iron (Fe), aluminum (Al), manganese (Mn), and combinations thereof.

In certain embodiments, the additional metal may comprise cobalt (Co) and aluminum (Al). The metal-containing oxyhydroxide may be further defined as a nickel-cobalt-aluminum oxyhydroxide. In these and other embodiments, the nickel-cobalt-aluminum oxyhydroxide has a formula according to Formula II:

$$Ni_xCo_yAl_z(OOH) \qquad II;$$

wherein $0<x<1$, $0<y<1$, $0<z<1$, and $x+y+z=1$. The variable x may be a number from greater than 0 to less than 1 or optionally from greater than 0.1 to less than 1. The variable y may be a number from greater than 0 to less than 1 or optionally from greater than 0.1 to less than 1. The variable z may be a number from greater than 0 to less than 1 or optionally from greater than 0.1 to less than 1.

In some embodiments, the additional metal may comprise manganese (Mn) and cobalt (Co). The metal-containing oxyhydroxide may be further defined as a nickel-manganese-cobalt oxyhydroxide. In these and other embodiments, the nickel-manganese-cobalt oxyhydroxide has a formula according to Formula III:

$$Ni_xMn_yCo_z(OOH) \qquad III;$$

wherein $0<x<1$, $0<y<1$, $0<z<1$, and $x+y+z=1$. The variable x may be a number from greater than 0 to less than 1 or optionally from greater than 0.1 to less than 1. The variable y may be a number from greater than 0 to less than 1 or optionally from greater than 0.1 to less than 1. The variable z may be a number from greater than 0 to less than 1 or optionally from greater than 0.1 to less than 1.

In other embodiments, the additional metal may comprise iron (Fe) and aluminum (Al). The metal-containing oxyhydroxide may be further defined as a nickel-iron-aluminum oxyhydroxide. In these and other embodiments, the nickel-iron-aluminum oxyhydroxide has a formula according to Formula IV:

$$Ni_xFe_yAl_z(OOH) \qquad IV;$$

wherein $0<x<1$, $0<y<1$, $0<z<1$, and $x+y+z=1$. The variable x may be a number from greater than 0 to less than 1 or optionally from greater than 0.1 to less than 1. The variable y may be a number from greater than 0 to less than 1 or optionally from greater than 0.1 to less than 1. The variable z may be a number from greater than 0 to less than 1 or optionally from greater than 0.1 to less than 1.

In various embodiments, the additional metal may comprise manganese (Mn). The metal-containing oxyhydroxide may be further defined as a nickel-manganese oxyhydroxide In these and other embodiments, has a formula according to Formula V:

$$Ni_yMn_{1-y}(OOH) \qquad V;$$

wherein $0<y<1$. The variable y may be a number from greater than 0 to less than 1 or optionally from greater than 0.1 to less than 1.

In some embodiments, the additional metal may comprise manganese (Mn) and iron (Fe). The metal-containing oxyhydroxide may be further defined as a nickel-manganese-iron oxyhydroxide. In these and other embodiments, nickel-manganese-iron oxyhydroxide has a formula according to Formula VI:

$$Ni_xMn_yFe_z(OOH) \qquad VI;$$

wherein $0<x<1$, $0<y<1$, $0<z<1$, and $x+y+z=1$. The variable x may be a number from greater than 0 to less than 1 or optionally from greater than 0.1 to less than 1. The variable y may be a number from greater than 0 to less than 1 or optionally from greater than 0.1 to less than 1. The variable z may be a number from greater than 0 to less than 1 or optionally from greater than 0.1 to less than 1.

In further embodiments, the additional metal may comprise cobalt (Co) and iron (Fe). The metal-containing oxyhydroxide may be further defined as a nickel-cobalt-iron oxyhydroxide. In these and other embodiments, nickel-cobalt-iron oxyhydroxide has a formula according to Formula VII:

$$Ni_xCo_yFe_z(OOH) \qquad VII;$$

wherein $0<x<1$, $0<y<1$, $0<z<1$, and $x+y+z=1$. The variable x may be a number from greater than 0 to less than 1 or optionally from greater than 0.1 to less than 1. The variable y may be a number from greater than 0 to less than 1 or optionally from greater than 0.1 to less than 1. The variable z may be a number from greater than 0 to less than 1 or optionally from greater than 0.1 to less than 1.

In still further embodiments, the additional metal may comprise cobalt (Co). The metal-containing oxyhydroxide may be further defined as a nickel-cobalt oxyhydroxide. In these and other embodiments, nickel-cobalt oxyhydroxide has a formula according to Formula VIII:

$$Ni_yCo_{1-y}(OOH) \qquad VIII;$$

wherein $0<y<1$. The variable y may be a number from greater than 0 to less than 1 or optionally from greater than 0.1 to less than 1.

In other embodiments, the additional metal may comprise iron (Fe). The metal-containing oxyhydroxide may be further defined as a nickel-iron oxyhydroxide. In these and other embodiments, nickel-iron oxyhydroxide has a formula according to Formula IX:

$$Ni_yFe_{1-y}(OOH) \qquad IX;$$

wherein $0<y<1$. The variable y may be a number from greater than 0 to less than 1 or optionally from greater than 0.1 to less than 1.

In various embodiments, the additional metal may comprise aluminum (Al). The metal-containing oxyhydroxide may be further defined as a nickel-aluminum oxyhydroxide. In these and other embodiments, nickel-aluminum oxyhydroxide has a formula according to Formula X:

$$Ni_yAl_{1-y}(OOH) \qquad X;$$

wherein $0<y<1$. The variable y may be a number from greater than 0 to less than 1 or optionally from greater than 0.1 to less than 1.

As introduced above, a method of forming the cathode active material precursor comprising the metal-containing oxyhydroxide is provide. The method comprises combining a nickel-containing compound, an additional metal-containing compound, an oxidizing agent, and a solvent to form a solution. In certain embodiments, the solution further comprises a basic chelating agent. In these and other embodiments, the method further comprises combining the nickel-containing compound, the additional metal-containing compound, the oxidizing agent, the basic chelating agent, and the solvent to form the solution. In accordance with the present disclosure, combining of the nickel-containing compound, the additional metal-containing compound, the oxidizing agent, basic chelating agent, and the solvent may involve one or more steps in any order.

The nickel-containing compound may be any nickel salt well understood in the art for use as a precursor compound. Non-limiting examples of suitable nickel (Ni) salts include nickel (Ni) sulfates, nickel (Ni) nitrates, nickel (Ni) chlorides, nickel (Ni) fluorides, and combinations thereof. In certain embodiments, the nickel-containing compound comprises a nickel (Ni) sulfate.

The additional metal-containing compound may be any metal salt well understood in the art for use as a precursor compound. Non-limiting examples of suitable metal salts include sulfates, nitrates, chlorides, or fluorides of cobalt (Co), iron (Fe), aluminum (Al), manganese (Mn), magnesium (Mg) calcium (Ca), titanium (Ti), vanadium (V), chromium (Cr), copper (Cu), zinc (Zn), gallium (Ga), strontium (Sr), yttrium (Y), zirconium (Zr), niobium (Nb), molybdenum (Mo), ruthenium (Ru), and combinations thereof. In certain embodiments, the additional metal-containing compound comprises cobalt (Co) sulfate, iron (Fe) sulfate, aluminum (Al) sulfate, manganese (Mn) sulfate, or combinations thereof The oxidizing agent may be selected from sodium persulfate ($Na_2S_2O_8$), potassium persulfate ($K_2S_2O_8$), and a combination thereof. However, it is to be appreciated that the oxidizing agent may be any compound understood in the art to be an electron acceptor so long as the compound is compatible with the metal compounds of the cathode active material precursor.

The basic chelating agent may be selected from an alkali metal hydroxide, ammonium hydroxide, and a combination thereof. However, it is to be appreciated that the basic chelating agent may be any compound understood in the art to form stable complexes with metals so long as the compound is compatible with the metal compounds of the cathode active material precursor.

The solvent may comprise an inorganic solvent, an organic solvent, water, or combinations thereof. Non-limiting examples of suitable solvents include butanol, acetonitrile, acetone, methanol, ethanol, N-methyl-2-pyrrolidone (NMP), water, and combinations thereof. However, any other solvent commonly used in the art may also be used. In certain embodiments, the solvent is water.

In an exemplary embodiments, the step of combining further comprises combining the nickel-containing compound, the additional metal-containing compound, and the solvent to form a first pre-mix. The first pre-mix may be an acidic solution and may comprise urea. The nickel-containing compounds and the additional metal-containing compounds may be present in the first pre-mix in suitable molar concentrations for forming the desired cathode active material precursor.

In these and other embodiments, the step of combining further comprises combining the alkali metal hydroxide and the ammonium hydroxide as the basic chelating agents to form a second pre-mix. The basic chelating agents may be present in the second pre-mix in suitable molar concentrations for forming the desired cathode active material precursor.

In these and other embodiments, the step of combining further comprises combining the first pre-mix, the second pre-mix, and the oxidizing agent (as a third pre-mix) to form the solution. The first pre-mix, the second pre-mix, and the oxidizing agent may be provided to form the solution in any suitable amount for forming the desired cathode active material precursor.

The method further comprises exposing the solution to heat at a temperature of from about 30° C. to about 90° C., optionally from about 40° C. to about 80° C., or optionally from about 50° C. to about 70° C., to form a precipitate comprising the metal-containing oxyhydroxide. The solution may be exposed to the heat for a time period of at least 1 hour, optionally at least 5 hours, or optionally at least 10 hours. The solution may have a pH of at least 10, optionally at least 11, or optionally at least 12, during exposure to the heat. The solution may be continuously stirred during exposure to the heat.

In various embodiments, the method further comprise separating the precipitate comprising the metal-containing oxyhydroxide and the solvent by applying a filter to the solvent. The precipitate comprising the metal-containing oxyhydroxide may then be washed one or more times and then dried at a temperature of at least 100° C. for a timer period of at least 2 hours to form the metal-containing oxyhydroxide.

It is to be appreciated that the aforementioned method may be seamlessly integrated into existing cathode manufacturing processes. This method can be scaled up from small batch synthesis of less than 5 grams to greater than 10 kilograms using large capacity industrial scale batch/continuously operated reactors. Depending upon the type of reaction system utilized, adept morphological controls can be achieved.

In an exemplary embodiment, the method of forming the cathode active material precursor comprising the metal-containing oxyhydroxide is as follows. An acidic solution (in suitable molar concentrations) containing the appropriate amounts of the nickel-containing compound and the additional metal-containing compound(s) of a specific desired composition in their sulfate forms along with an appropriate amount of urea may be formed as the first pre-mix. A basic chelating agent solution (in suitable molar concentrations) containing a suitable alkali metal hydroxide and ammonium hydroxide ($NH_4OH$) may be formed as the second pre-mix. An oxidizing agent solution (in suitable molar concentrations) containing sodium or potassium persulfate ($Na_2S_2O_8$ or $K_2S_2O_8$) may be formed as the third pre-mix.

The first, second, and third pre-mix solutions are simultaneously added to a reaction vessel where particles are precipitated immediately. The pH of the reaction medium is maintained above 10 and the temperature is in the range of 50° C. to 70° C. while being continuously stirred for a time period of from 5 hours to 15 hours. Next, the solution is filtered to separate the precipitate comprising the comprising the metal-containing oxyhydroxide from the solvent. The precipitate is then repeatedly washed before finally being dried at over 100° C. for a time period of from 2 hours 10 hours.

A lithium metal oxide for a cathode is also provided. The lithium metal oxide comprises the reaction product of the cathode active material precursor described above and a lithium-containing compound. In certain embodiments, the lithium-containing compound is selected from a lithium carbonate, a lithium hydroxide, a lithium sulfate, a lithium nitrate, a lithium chloride, and combinations thereof. The lithium metal oxide may be formed from the cathode active material precursor and the lithium-containing compound in in a molar equivalent ratio of the precursor to the lithium-containing compound of from about 1:1 to about 1:2 or optionally from about 1:1.01 to about 1:1.20.

A method of forming the lithium metal oxide is also provided. The method may comprise combining the cathode active material precursor and a lithium-containing compound to form a precursor mixture, and exposing the precursor mixture to a temperature of at least 500° C. for calcinating the precursor mixture to form the lithium metal oxide. In certain embodiments, the calcinating temperature may be from 600 to 900° C., optionally 650 to 850° C., or optionally 700 to 800° C. The pH, concentration of the feeds, temperature, and maturation time may be adjusted to control particles morphology, size, and porosity of the lithium metal oxide.

In certain embodiments, the lithium metal oxide has a crystalline structure comprising a transition metal-containing slab and a lithium-containing slab. In these and other embodiments, the lithium-containing slab is substantially free of nickel. The phrase "substantially free" as utilized herein with reference to nickel means that the lithium-containing slab of the crystalline structure of the lithium metal oxide comprises nickel in an amount of less than 1 mol. %, less than 0.1 mol. %, or less than 0.01 mol. %. It is believed that the oxyhydroxide form (—OOH) of the cathode active material precursor incorporates nickel ions in a +3 oxidation state thereby minimizing cation mixing with lithium. In particular, the oxyhydroxide form (—OOH) of the cathode active material precursor incorporate nickel ions in the +3 oxidation state which upon calcination remains in the transition metal-containing slab thus minimizing cation mixing with the lithium-containing slab. As a result, lithium diffusion pathways are not blocked by nickel ions in a +2 oxidation state thereby leading to improved performance of the resulting lithium metal oxide.

The lithium metal oxide may be directly coated on a metallic current collector and dried to form the cathode. Alternatively, the lithium metal oxide may be cast on a separate support, and then a film separated from the support is laminated on the metallic current collector to form the cathode.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A method of forming a lithium metal oxide, the method comprising:
    forming a cathode active material precursor including a metal-containing oxyhydroxide by:
        combining a nickel-containing compound, an additional metal-containing compound, an oxidizing agent, a basic chelating agent, and a solvent to form a solution; and
        exposing the solution to heat at a temperature of from about 30° C. to about 90° C. to form a precipitate comprising the metal-containing oxyhydroxide;
        wherein at least 50 mol. % of the nickel of the metal-containing oxyhydroxide has an oxidation state of +3; and
        wherein the basic chelating agent comprises an alkali metal hydroxide and ammonium hydroxide;
    combining the cathode active material precursor and a lithium-containing compound to form a precursor mixture, wherein a molar equivalent ratio of the cathode active material precursor to the lithium-containing compound is from about 1:1.01 to about 1:1.20; and
    exposing the precursor mixture to a temperature of at least 500° C. for calcinating the precursor mixture to form the lithium metal oxide.

2. The method of claim 1, wherein the metal-containing oxyhydroxide has a formula according to Formula I:

$$Ni_yM_{1-y}(OOH) \qquad\qquad I;$$

wherein 0<y<1, and M is one or more of the additional metal.

3. The method of claim 1, wherein the oxidizing agent is selected from sodium persulfate, potassium persulfate, and a combination thereof.

4. The method of claim 1, wherein the step of combining the nickel-containing compound, the additional metal-containing compound, the oxidizing agent, the basic chelating agent, and the solvent to form a solution further comprises:
    combining the nickel-containing compound, the additional metal-containing compound, and the solvent to form a first pre-mix;
    combining the alkali metal hydroxide and the ammonium hydroxide to form a second pre-mix; and
    combining the first pre-mix, the second pre-mix, and the oxidizing agent to form the solution.

5. The method of claim 1, wherein the nickel-containing compound comprises a nickel sulfate, and wherein the additional metal-containing compound comprises cobalt sulfate, iron sulfate, aluminum sulfate, manganese sulfate, or combinations thereof.

6. The method of claim 1, wherein the solution is exposed to the heat for a time period of at least 1 hour.

7. The method of claim 1, wherein the solution has a pH of at least 10 during exposure to the heat.

8. The method of claim 1, wherein the lithium metal oxide has a crystalline structure comprising a nickel-containing transition metal slab and a lithium-containing slab, wherein the lithium-containing slab is substantially free of nickel.

9. The method of claim 2, wherein the metal-containing oxyhydroxide has a formula according to Formula I:

$$Ni_yM_{1-y}(OOH) \qquad\qquad I;$$

wherein 0.6<y<1, and M is one or more of the additional metal.

* * * * *